Jan. 2, 1951     A. J. SMITH ET AL     2,536,321
SAFETY DEVICE
Filed Dec. 30, 1946
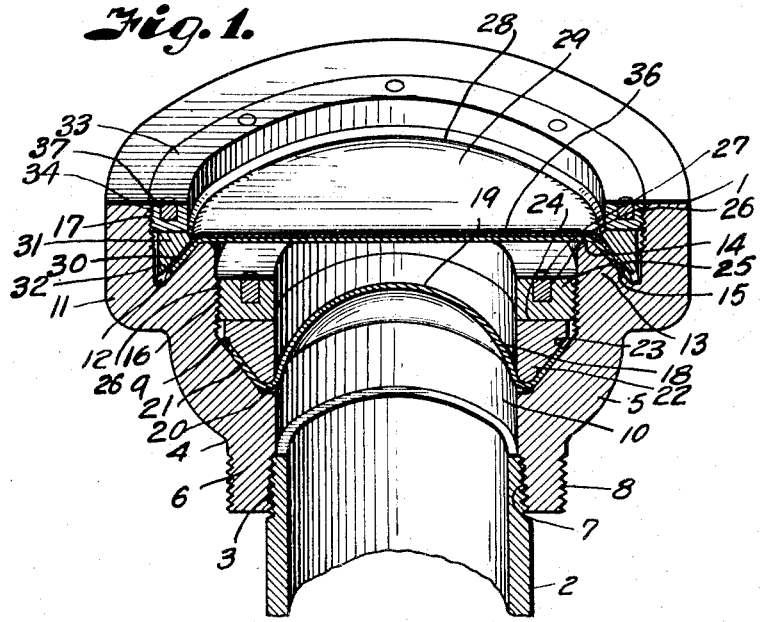
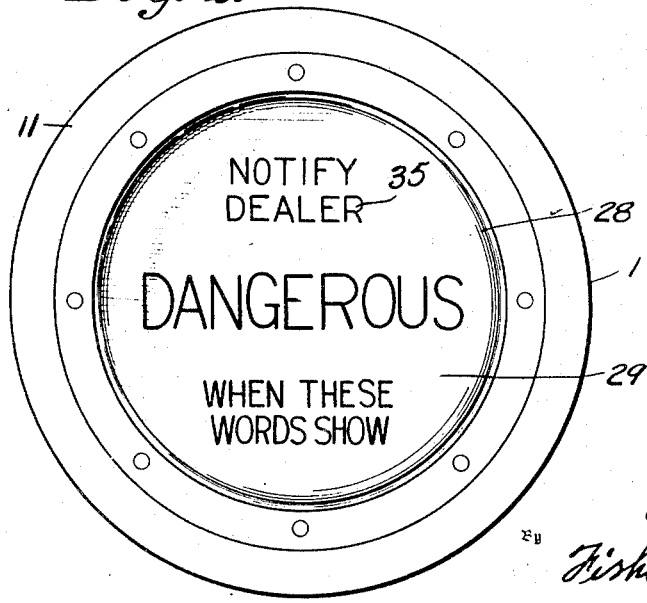
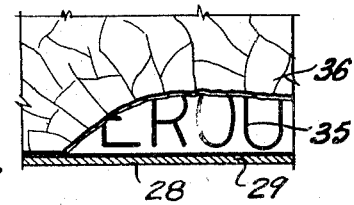
Inventors
Arthur J. Smith, and
Gwynne Raymond
Attorneys Patented Jan. 2, 1951

2,536,321

UNITED STATES PATENT OFFICE 2,536,321

SAFETY DEVICE

Arthur J. Smith, Independence, Mo., and Gwynne Raymond, Oklahoma City, Okla., assignors to Black, Sivalls & Bryson, Inc., Kansas City, Mo., a corporation of Delaware Application December 30, 1946, Serial No. 719,328

14 Claims. (Cl. 220—27)

1

This invention relates to safety devices of the frangible diaphragm type as disclosed in the Raymond Patent 1,930,960, issued October 17, 1933.

There is a possibility that frangible elements of the type disclosed in this patent might develop a leak around the periphery thereof or through pin holes in the diaphragm that result from corrosion or other causes.

It is, therefore, a principal object of the present invention to provide a safety device which includes an auxiliary or signal diaphragm in combination with the main frangible diaphragm to serve as a protector for the main frangible element and to indicate leakage thereof if leakage occurs.

Other objects of the invention are to provide the protecting diaphragm with hidden indicia that are rendered visible upon leakage occurring through or past the main frangible element, and to provide a protecting or signal diaphragm of different material than the main frangible element for protecting the main element from corrosion.

In accomplishing these and other objects of the present invention, we have provided improved structure, the preferred form of which is illustrated in the accompanying drawing wherein:

Fig. 1 is a perspective section of a safety device embodying the features of the present invention.

Fig. 2 is a plan view of the safety device.

Fig. 3 is a fragmentary section with the auxiliary or protector diaphragm illustrating functioning thereof to indicate leakage of the main frangible diaphragm of the safety device.

Referring more in detail to the drawing:

1 designates a safety device which is adapted for attachment to a part of a pressure system that must be protected against occurrences of sudden pressure differentials and which is made subject to the pressure in the system through a duct 2. The duct 2 is shown in the drawings as being provided with external threads 3 for mounting the safety device. The safety device includes a housing 4 having a substantially bowl-shaped body portion 5 including an annular flange 6 at its base and an open top, the flange 6 being internally threaded as at 7 to receive the external threads 3. The flange may also be externally threaded as at 8 so that it is adapted for mounting in an internally threaded duct or fitting if desired.

The housing 4 extends upwardly and outwardly from the flange 6 and has an internal beveled annular seat or gripping face 9 encircling a flow opening 10 therethrough. The housing 4 includes a rim portion 11 that extends outwardly from the seat 9 and is provided with substantially V-shaped annular groove 12 encircling an annular rib 13 having a rounded edge 14 terminating in an outwardly tapered annular seat 15 sloping oppositely to the seat 9. The rim of the housing is internally threaded above each of the respective seats as at 16 and 17.

18 designates a main frangible element or diaphragm that normally closes the flow opening 10 but which is adapted to fracture under excessive pressure differential. The diaphragm 18 is formed of a suitable material which is preferably shaped to provide a dome 19 of uniform thickness and capable of fracturing from pressure acting upon the concave side. The dome-shaped portion 19 of the diaphragm terminates from a smoothly rounded annular bend 20 into an outwardly flaring annular flange 21 which engages the seat 9 and is retained thereon by a clamping ring 22. The clamping ring encircles the dome portion of the diaphragm and has an inner diameter substantially corresponding to that of the flow opening 10 and an outer periphery forming a tapered seating or clamping face 23 that engages the inner side of the flaring flange 21 of the frangible diaphragm. The ring 22 has an exterior diameter to pass the threads 16 and has a substantially flat face 24 engaged by a ring 25 that is provided with circumferential threads 26 engaging the threads 16. The ring 25 has an innner diameter substantially conforming to the inner diameter of the ring 22 so as to form a continuation of the flow opening in case of rupture of the frangible element. The ring 25 is turned within the threads by means of a suitable spanner wrench (not shown) to draw the ring 22 in clamping contact with the flaring flange of the diaphragm and to clamp the flange against the seat 9 so as to provide a leak-tight seal therebetween. If desired, the sockets 26 which are engaged by the socket wrench may be filled with a suitable material as indicated at 27 to prevent unauthorized removal of the retaining ring or tampering with the diaphragm.

As above pointed out, it is possible that leakage might occur between the seat 9 and flaring flange 21 of the diaphragm. It is also possible that leakage may occur through pin holes that may appear in the diaphragm because of corrosion which would allow for slow escape of the pressure medium from the pressure system to which the duct 2 is connected. In many instances, for example, in the case where the safety device is connected with a propane tank, such leakage is dangerous.

In order to avoid this difficulty and to indicate when such leakage occurs, the present invention contemplates an auxiliary frangible diaphragm 28. In the illustrated instance the auxiliary diaphragm 28 includes a substantially flat disk-like portion 29 seated on the rounded portion of the rib 13 in covering relation with the dome portion of the main diaphragm. The auxiliary diaphragm also includes an outwardly flaring flange 30 arranged reversely to the flange 21 of the main diaphragm for engaging directly the seat 15 and which is retained in contact therewith by a wedge-shaped ring 31 located in the groove 12 and which has a beveled inner gripping face 32 engaging the outer face of the flange 30. The retaining ring is secured in contact with the flange and the flange against the seat by a ring 33 having exterior threads 34 engaging the threads 17 previously described. The ring 30 encompasses the flat portion of the auxiliary diaphragm whereby the upper surface of the diaphragm is completely exposed through the open top of the housing to provide a site on which indicia designated 35 are lettered into or on the diaphragm. This indicia may include the command "Notify the Dealer When These Words Show" and the word "Dangerous." The indicia are then covered with an opaque coating 36 of brittle characteristic such as a brittle lacquer to conceal the indicia but which is adapted to spall off incidental to any bulging of the diaphragm caused by leakage of the main diaphragm or accumulation of pressure under the auxiliary diaphragm. The outer retaining ring might also be provided with spanner sockets 37 which are filled with suitable material to prevent unauthorized removal thereof after the ring is in place.

In assembling the safety device, the main frangible element or diaphragm 18 is inserted within the housing so that the flange 21 thereon engages the seat 9 after which the ring 22 is placed thereover and moved into clamping engagement upon insertion of the threaded ring 25 by means of a suitable spanner wrench. After the ring 25 is in place the socket openings for the wrench are filled with sealing material as shown in Fig. 1. The auxiliary diaphragm 28 is then placed over the annular rib 13 so that the outwardly flaring flange thereof engages the seat 15. The clamping ring 31 is then inserted into the groove and moved into clamping contact when the ring 33 is turned into the housing by means of a spanner wrench or the like engageable with the socket-like recesses which are subsequently filled with sealing material.

The safety device is preferably sold as a unit assembled at the factory and applied as a unit to the vessel or pressure system it is to protect.

In selecting a safety head to function at a given pressure, a safety device having the proper diaphragms must be selected, that is, the sum of the calculated bursting pressures for the respective diaphragms substantially equal the desired pressure at which the safety device is to function. For example, assuming that a safety device is to be used on a propane tank to be maintained at 200 pounds working pressure, the pressure at which the safety device is to function should be around 400 pounds. Therefore, the main diaphragm selected may have a bursting pressure of 300 pounds and the auxiliary or protector diaphragm a bursting pressure after deformation of 100 pounds.

The differential relationships of the bursting pressures of the diaphragms is for the reason that should leakage occur through the main diaphragm as, for example, through a minute pin hole or a minute leak around the anchoring flange of the diaphragm, the space between the main diaphragm and the auxiliary diaphragm might become filled with the pressure to equilibrium with the pressure in the vessel to the end that a sudden rise in pressure both diaphragms would be effective in series.

The sum of the bursting pressure of the two diaphragms should not be greater than the elastic limit of any part of the propane tank or other equipment to which it is attached.

When the device is mounted on the duct 2 which connects with the mechanism to be protected, it is merely screwed thereon to close the duct and subject the concave side of the main diaphragm to the pressure in the system.

In case of a leak through the main diaphragm, pressure will accumulate within the space between the respective diaphragms to effect bulging of the auxiliary diaphragm. This bulging of the diaphragm will indicate that a dangerous condition exists and to make the warning more noticeable, the bulging cracks and shatters the lacquer coating so that it spalls therefrom to expose the indicia and definitely indicate that the main diaphragm is defective or improperly seated.

In case sudden pressure should occur, the main diaphragm will rupture at its predetermined pressure to be followed by rupture of the auxiliary diaphragm so as to afford adequate relief of the pressure through the flow opening 10.

If the safety device becomes hazardous and indicated by the action of the auxiliary diaphragm, the defective device may be removed and replaced with another. Also, should the diaphragms function to relieve pressure, the old safety device is removed and replaced with a factory-assembled unit.

If desired, the auxiliary diaphragm may be formed of a different material than the main diaphragm to serve as precaution against corrosion or other misbehavior of the main diaphragm.

From the foregoing it is obvious that we have provided a safety device of the frangible diaphragm type wherein the main diaphragm is protected by an auxiliary diaphragm which also serves as an indicator means for disclosing dangerous conditions that may exist in the main diaphragm.

What we claim and desire to secure by Letters Patent is:

1. A safety device including a main frangible diaphragm, an auxiliary diaphragm having an outer face, means supporting said diaphragms in spaced relation, said auxiliary diaphragm being adapted to bulge responsive to pressure that may accumulate in the space between said diaphragms, and a coating on the outer face of the auxiliary diaphragm, said coating being of brittle characteristic and capable of spalling upon bulging of the auxiliary diaphragm.

2. A safety device including a main frangible diaphragm, an auxiliary diaphragm, means supporting said diaphragms in spaced relation, said auxiliary diaphragm being adapted to bulge responsive to pressure that may accumulate in the space between said diaphragms, lettering on said bulgeable portion of the auxiliary diaphragm, and an opaque coating covering said lettering and capable of spalling upon bulging of said diaphragm.

3. A safety device including a housing having a flow passageway provided with an inlet and an outlet and having axially spaced diaphragm seats intermediate the inlet and outlet, a main frangible diaphragm mounted on the seat at the inlet of said passageway, means in the housing for clamping the diaphragm to said seat, an auxiliary diaphragm on the other diaphragm seat and having an outer face exposed through the outlet of said passageway, means in the housing for clamping the auxiliary diaphragm to said seat, and a coating on the outer face of said auxiliary diaphragm, said coating being of brittle characteristic and capable of spalling upon movement of the auxiliary diaphragm responsive to building up of pressure within the space between said diaphragms.

4. A safety device including a housing having a flow passageway therethrough and axially spaced diaphragm seats encircling the flow passageway, frangible diaphragms on the respective seats, means in the housing for clamping the diaphragms to said seats, one of said diaphragms having a face being exposed through an end of the passageway, and a coating on said diaphragm face, said coating being of brittle characteristic and capable of spalling upon movement of said diaphragm responsive to building up of pressure between said diaphragms incidental to leakage occurring in the other diaphragms.

5. A safety device including a housing having a flow passageway therethrough and axially spaced diaphragm seats encircling the flow passageway, frangible diaphragms mounted on the respective seats and having differential bursting pressures, means in the housing for clamping the diaphragms to said seats, said diaphragm of lowest bursting pressure having a face portion exposed through the flow passageway, and a coating on said face of the diaphragm of lowest bursting pressure, said coating being of brittle characteristic and capable of spalling upon movement of said diaphragm responsive to building up of pressure between said diaphragms occurring through leakage of the diaphragm of higher bursting pressure.

6. A safety device including a housing having a flow passageway therethrough and axially spaced annular seats tapering in opposite directions and of differential diameter, a main frangible diaphragm having a flaring flange mounted on the seat of smaller diameter, a clamping ring engaging the opposite side of said flange, a retaining ring having threaded connection with the housing for urging the clamping ring into contact with said flange and the flange against said seat, an auxiliary diaphragm having an oppositely flaring flange engaging the seat of larger diameter, a clamping ring for said flange of the auxiliary diaphragm, a similar retaining ring for the last named clamping ring, and a coating on the auxiliary diaphragm, said coating being of brittle characteristic and capable of spalling upon movement of the auxiliary diaphragm responsive to building up of pressure between said diaphragms.

7. A safety device including a housing having a flow passageway therethrough and axially spaced annular seats tapering in opposite directions, and of differential diameter, a main frangible diaphragm having a flaring flange mounted on the seat of smaller diameter, a clamping ring engaging the opposite side of said flange, a retaining ring having threaded connection with the housing for urging the clamping ring into contact with said flange and the flange against said seat, an auxiliary diaphragm having an oppositely flaring flange engaging the seat of larger diameter, a clamping ring for said flange of the auxiliary diaphragm, a similar retaining ring for the last named clamping ring, and a coating on the auxiliary diaphragm, said coating being of brittle characteristic and capable of spalling upon movement of the auxiliary diaphragm responsive to building up of pressure between said diaphragms, said auxiliary diaphragm having indicia under said coating.

8. A safety device including a housing having a flow passageway therethrough and axially spaced annular seats tapering in opposite directions and of differential diameter, a main frangible dome-shaped diaphragm having an annular outwardly flaring anchoring flange mounted on the dome side of said diaphragm and on the seat of smaller diameter, a clamping ring engaging the dome side of said anchoring flange, a retaining ring having connection with the housing for urging the clamping ring into contact with said anchoring flange and the flange against said seat, an auxiliary diaphragm having an oppositely flaring flange engaging the seat of larger diameter, a clamping ring for said flange of the auxiliary diaphragm, a similar retaining ring for the last named clamping ring, and a coating on the auxiliary diaphragm, said coating being of brittle characteristic and capable of spalling upon movement of the auxiliary diaphragm responsive to building up of pressure between said diaphragms.

9. In a safety device, a frangible diaphragm, and a coating on the diaphragm, said coating being of brittle characteristic and capable of spalling upon bulging movement of the diaphragm responsive to building up of pressure on said diaphragm.

10. In a safety device, a frangible diaphragm, and a coating on the diaphragm, said coating being of brittle characteristic and capable of spalling upon bulging movement of the diaphragm responsive to building up of pressure on said diaphragm, said diaphragm having indicia under said coating.

11. A safety device including a main frangible diaphragm having a rated bursting pressure and normally adapted to retain pressure below said rated pressure, a signal diaphragm, means supporting said diaphragms in spaced relation, said signal diaphragm being formed of a material capable of bulging under pressure acting thereon below said rated pressure of the frangible diaphragm whereby said signal diaphragm bulges responsive to any leakage of pressures by the frangible diaphragm which are lower than said rated bursting pressure, and a spallable material on the signal diaphragm for indicating bulging of the signal diaphragm.

12. A safety device including a housing having a flow passageway therethrough and axially spaced main and signal diaphragm seats encircling the flow passageway, a main frangible diaphragm mounted on the main diaphragm seat and having a rated bursting pressure and normally adapted to retain pressures below said rated pressure, means in the housing for clamping the main diaphragm to its seat, a signal diaphragm on said other seat and formed of a material adapted to bulge under pressure acting thereon below the rated pressure of the frangible diaphragm and a spallable material on the signal diaphragm for indicating bulging of the signal diaphragm, and means in the housing for clamping the signal diaphragm to said other diaphragm seat.

13. A safety device including a flexible signal diaphragm adapted to flex when a pressure acts on one side of the diaphragm, and a substantially brittle coating on the diaphragm of less flexibility than the diaphragm whereby said coating spalls under flexure of the diaphragm.

14. A safety device including a flexible signal diaphragm adapted to flex when a pressure acts on one side of the diaphragm having indicia thereon, and a coating on the diaphragm and covering the indicia, said coating being of brittle characteristic and of less flexibility than the diaphragm whereby said coating spalls off to expose said indicia upon flexure of the diaphragm.

ARTHUR J. SMITH.
GWYNNE RAYMOND.

REFERENCES CITED

The following references are of record in the file of this patent:

UNITED STATES PATENTS

| Number | Name | Date |
| --- | --- | --- |
| 568,680 | Henderson | Sept. 29, 1896 |
| 1,535,536 | MacDonald | Apr. 28, 1925 |
| 2,242,547 | Raymond | May 20, 1941 |
| 2,261,035 | Miller | Oct. 28, 1941 |
| 2,263,840 | Franck | Nov. 25, 1941 |
| 2,387,353 | Raymond | Oct. 23, 1945 |